US006931291B1

(12) United States Patent
Alvarez-Tinoco et al.

(10) Patent No.: US 6,931,291 B1
(45) Date of Patent: Aug. 16, 2005

(54) METHOD AND APPARATUS FOR FREQUENCY-DOMAIN DOWNMIXING WITH BLOCK-SWITCH FORCING FOR AUDIO DECODING FUNCTIONS

(75) Inventors: Mario Antonio Alvarez-Tinoco, Singapore (SG); Sapna George, Singapore (SG); Haiyun Yang, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 09/423,413

(22) PCT Filed: May 8, 1997

(86) PCT No.: PCT/SG97/00020

§ 371 (c)(1), (2), (4) Date: Mar. 31, 2000

(87) PCT Pub. No.: WO98/51126

PCT Pub. Date: Nov. 12, 1998

(51) Int. Cl.[7] ........................ G06F 17/00; G10L 21/00; H04R 5/00

(52) U.S. Cl. ........................ 700/94; 704/500; 704/503; 381/22

(58) Field of Search .......................... 700/94; 704/220, 704/229, 500, 503; 375/242; 84/625; 341/67; 381/22

(56) References Cited

U.S. PATENT DOCUMENTS 5,686,683 A * 11/1997 Freed .......................... 84/625
5,867,819 A * 2/1999 Fukuchi et al. ............. 704/500
5,946,352 A * 8/1999 Rowlands et al. .......... 375/242
6,141,645 A * 10/2000 Chi-Min et al. ............ 704/500
6,205,430 B1 * 3/2001 Hui ............................ 704/500
6,356,870 B1 * 3/2002 Hui et al. ................... 704/500

FOREIGN PATENT DOCUMENTS

EP 0697665 A2 * 2/1996 ........... G06F 17/14

* cited by examiner

*Primary Examiner*—Sinh Tran
*Assistant Examiner*—Andrew Graham
(74) *Attorney, Agent, or Firm*—Lisa K. Jorgenson; E. Russell Tarleton; Seed IP Law Group PLLC

(57) ABSTRACT

An audio decoder solution is here provided where a reduction in computing power is required. The proposed method consists of forcing the multiple output channels to only one type of inverse transformation format. A format of long transform length is more suitable for input signals whose spectrum remains stationary or quasi-stationary. This provides a greater frequency resolution, improved coding performance and a reduction of computing power required. Another format of two or more short transform lengths, possessing greater time resolution, is more desirable for rapidly changing signals with time. The computer power required for two or more short transforms should be higher than for only one transformation. The time versus frequency resolution trade-off should be considered when selecting a transform block length. Advantage is taken of human hearing behaviour to reduce the computing power of a processing engine (e.g. DSP) when downmixing from an M-channel input to a P-channel output is required. The encoder provides spectral information concerning the transmitted audio signal frame. This information corresponds to signals which are stationary/quasi-stationary or changing rapidly with time. Some analysis is required to decide which input channels are forced to long or short block conversion prior to frequency-domain downmixing and transformation.

20 Claims, 8 Drawing Sheets

Block Diagram of Block Switch Forcing Method

Digital Audio Transmission System

Decoding Process for Digital Audio Transmission System

Time-Domain Signal Processing (TDSP) Section

—Block Diagram of TDSP Section

Practical Implementation of Overlap-and-Add Technique for One Long Block Size Format

*FIG. 6* Block Diagram of Practical Implementation of Frequency-domain to Time-domain Conversion Block Diagram of Block Switch Forcing Method Frequency-Domain Downmixing Prior to Time-Domain Conversion
Forcing one Long Block (LB) into two or more Short Blocks (SBs)

Frequency-Domain Downmixing Prior to Time-Domain Conversion
Forcing two or more Short Blocks (SBs) into one Long Block (LB)

METHOD AND APPARATUS FOR FREQUENCY-DOMAIN DOWNMIXING WITH BLOCK-SWITCH FORCING FOR AUDIO DECODING FUNCTIONS

BACKGROUND OF THE INVENTION

1. Field of the Invention

This invention relates generally to audio decoders. More particularly, the present invention relates to mull-channel audio compression decoders with downmixing capabilities.

2. Description of the Related Art

An audio decoder generally comprises two basic parts: a demultiplexing portion, the main function of which consists of unpacking a serial bit stream of encoded data, which in this case is in the frequency-domain; and time-domain signal processing, which converts the demultiplexed signal back to the time-domain. A mufti-channel output section may be provided to cater to a multiple output format. If the number of channels required at the decoder output is smaller than the number of channels which are encoded in the bit stream, then downmixing is required. Downmixing in the time-domain is usually provided in present decoders. However, since the inverse frequency-domain transform is a linear operation, it is also possible to downmix in the frequency-domain prior to transformation.

The encoded data representing the audio signals may convey from one to multiple full bandwidth channels, along with a low frequency channel. The encoded data is organized into synchronization frames. The way in which the demultiplexing and time-domain signal processing portions are related is a function of the information available in a synchronization frame. Each frame contains several coded audio blocks, each of which represents a series of audio samples. Further, each frame contains a synchronization information header to facilitate synchronization of the decoder, bit stream information for informing the decoder about the transmission mode and options, and an auxiliary data field which may include user data or dummy data. For example for an AC-3 audio decoder from Dolby Laboratories of San Francisco, Calif., the data field is adjusted by the encoder such that the cyclic redundancy check element falls on the last word of the frame. The cyclic redundancy check word is checked after more than half of the frame has been received. Another cyclic redundancy check word is checked after the complete frame has been received, such as described in Advance Television Systems Committee, Digital Audio Compression Standard (AC-3), 20 Dec. 1995. Another example is the MPEG-1 standard audio decoder where the cyclic redundancy check-word is optional for normal operation. However, if the MPEG-2 extension is required, then there is a compulsory cyclic redundancy check-word.

An audio block also contains information relating to splitting of the block into two or more sub-blocks during the transformation from the time-domain to the frequency-domain. A long block length allows the use of a long transform length, which is more suitable for input signals whose spectrum remains stationary or quasi-stationary. This provides a greater frequency resolution, improved coding performance and a reduction of computing power required. Two or more short length transforms, utilized for short block lengths, enable greater time resolution, and are more desirable for signals whose spectrum changes rapidly with time. The computer power required for two or more short transforms is ordinarily higher than if only one transformation is required. This approach is very similar to behavior known to occur in human hearing.

Again as an example, in the Dolby AC-3 audio decoder mentioned above, dither, dynamic range, coupling function, channel exponents, bit allocation function, gain, channel mantissas and other parameters are also contained in each block. However, they are represented in a compressed format, and therefore unpacking, setting-up tables, decoding, expansion, calculations and computations must be performed before the pulse coded modulation (PCM) audio samples can be recognised.

The input bit stream for a decoder will typically come from a transmission (such as HDTV, CTV) or a storage system (e.g. CD, DAT, DVD). Such data can be transmitted in a continuous way or in a burst fashion. The demultiplexing and bit decoding portion of the decoder synchronises the frame and stores up to more than half of the data before the start of processing. The synchronisation word and bit stream information are unpacked only once per frame. The audio blocks are unpacked one by one and at this stage each block containing the new audio samples may not have the same length (i.e. the number of bits in each block may differ). However, once the audio blocks are decoded, each audio block will have the same length. The first audio block contains not only new PCM audio samples but also extra information which concerns the complete frame. The rest of the audio blocks may contain a smaller number of bits. The bit decoding section performs an unpacking and decoding function, the final product of which will be the frequency transform coefficients of each channel involved, in a floating-point format (exponents and mantissas) or fixed-point format.

The time-domain signal processing (TDSP) section first receives the transform coefficients one block at a time. In normal operation, when the signals spectra are relatively stationary in nature and have been frequency-domain transformed using a long transform length, a block-switch flag is disabled. The TDSP uses a 2N-point inverse fast Fourier transform (IFFT) of corresponding long length to obtain N time-domain samples. When fast changing signals are considered, the block-switch flag is enabled and signals are frequency-domain transformed differently, though the same number of coefficients, N, are also transmitted. Then, a short length inverse transform is used by the TDSP.

Where the audio decoder receives M channel inputs (M an integer), and produces P output channels, where M>P and P>0, the audio decoder must provide M frequency-domain transformations. Since only P output channels are required, a downmixing process is then performed. The number of channel is downmixed from M to P:

BRIEF SUMMARY OF THE INVENTION

It is an object of the invention to provide an audio decoder which mixes M channels down to P channels in the frequency-domain rather than in the time-domain; M>P and P>0. This can be referred to as the block-switch forcing method. Accordingly, the maximum number of M frequency-domain to time-domain transformations is not required. Instead, according to the type of signal transformed into the frequency-domain, the number of these transformations can be reduced from M to P.

In accordance with the present invention, there is provided a method of audio data decoding, comprising: receiving a data signal and demultiplexing the data signal into a plurality of M frequency-domain input data channels; downmixing said M frequency-domain input channels into P frequency-domain channels, where M>P and P>0, M and P both integers; and selecting an inverse transformation length and performing an inverse transformation of the P frequency-domain channels according to the selected length, so as to produce P audio sample output channels.

The present invention also provides an audio decoder, comprising: a demultiplexer for receiving a data signal and demultiplexing the data signal into a plurality of M frequency-domain input data channels; means for downmixing said M frequency-domain input channels into P frequency-domain channels, where M>P and P>0, M and P both integers; and means for selecting an inverse transformation length and performing an inverse transformation of the P frequency-domain channels according to the selected length, so as to produce P audio sample output channels.

Preferably, the transform length of each of the M frequency-domain input channels is determined. The transform lengths of the input channels may comprise a long or a short transform length, and the relative numbers of long and short transform lengths amongst the M input channels may be utilised to select the inverse transform length for performing the inverse transformation of the P downmixed frequency-domain channels.

In embodiments of the invention described herein, a specific data channel contains a number of transform coefficients and information indicating the type of transformation effected in the encoding process, such as a transformation involving one long block (referred to as "longblock" or "LB" hereafter), or two or more short blocks (referred to as "shortblock" or "SB" hereafter) being transformed one after the other. There are several combinations of frequency-domain downmixing using the herein described block-switch forcing method:

(1) If the number of input channels is an even number (M even) and the number of channels comprising longblocks is LB≦M/2, then the channels with LB will be converted to shortblock, SB, channels.

(2) If the number of input channels is an even number (M even) and the number of channels comprising longblocks is LB>M/2, then the channels with LB will remain intact.

(3) If the number of input channels is an even number (M even) and the number of channels with shortblocks is SB<M/2, then the channels with SB will be converted to longblock, LB, channels.

(4) If the number of input channels is an even number (M even) and the number of channels with shortblocks is SB≧M/2, then the channels with SB will remain intact.

(5) If the number of input channels is an odd number (M odd) and the number of channels comprising longblocks is LB≦INT(M/2), then the channels with LB will be converted to shortblock, SB, channels.

(6) If the number of input channels is an odd number (M odd) and the number of channels comprising longblocks is LB>INT(M/2), then the channels with LB will remain intact.

(7) If the number of input channels is an odd number (M odd) and the number of channels with shortblocks is SB<INT(M/2), then the channels with SB will be converted to longblock, LB, channels.

(8) If the number of input channels is an odd number (M odd) and the number of channels with shortblocks is SB≧INT(M/2), then the channels with SB will remain intact.

When one of the previous combinations applies, the block-switch forcing method and the downmixing in the frequency domain (i.e. M down to P channels) can be performed. This applies for all the channels having the same format, either longblock, LB, or shortblock, SB, formats. This approach can save (M-P) frequency-domain to time-domain transformations, and thus significant processing resources can be saved.

Considering that:

(a) a long transform length is more suitable for input signals whose spectrum remains stationary or quasi-stationary (this provides a greater frequency resolution, improved coding performance and a reduction of computing power required); and that:

(b) two or more short length transforms, possessing greater time resolution, is more desirable for signals having spectra rapidly changing with time (the computer power required for two or more short transforms is generally higher than for only one transformation);

the preferred form of channel conversion is from two or more shortblocks, SBs, to only one longblock, LB, due to the lower computing power required. However, the option of converting from one longblock, LB, to two or more shortblocks, SBs, is also within the scope of this invention.

It will be appreciated that the manner of selection of block conversion will in practice depend on the actual characteristics of the audio samples being analyzed. In other words, if in the M-input channels, the numbers of longblock, LB, format channels is higher than the number of shortblock, SB, format channels, this suggests that the particular frame of audio samples are stationary or quasi-stationary in nature and that the shortblocks should be converted to a longblock. On the other hand, if in the M-input channels, the number of longblock, LB, format channels is smaller than the number of shortblock, SB, format channels, then this also suggests that the particular frame of audio samples contains a higher time domain resolution and that a longblock should be converted to shortblocks. Any given audio program may have any type of signal content; from purely stationary waveforms to completely random behavior. However, some further simplifications can be obtained if the general nature of the audio program is known a priori, which would allow the audio decoder to determine in advance the most suitable form of block conversions, without having to make that determination from an examination of the received data itself.

Example of the Methodology of the Invention a) For converting N frequency-domain audio samples from a longblock, LB, format to two or more shortblock, SB, format, the longblock can be split as follows:

| | |
|---|---|
| SB-1: $X_0[Sk]$; | $k = 0, 1, \ldots, N-1$ |
| SB-2: $X_1[Sk+1]$; | $k = 0, 1, \ldots, N-1$ |
| SB-S: $X_{S-1}[Sk+(S-1)]$; | $k = 0, 1, \ldots, N-1$ |

The frequency-domain downmixing is then performed and the frequency-domain to time-domain conversion using shortblocks is applied. Note, S is the number of shortblocks the longblock is divided into.

The downmixed output can be represented as:

$Y_0[k]$=downmixed from$\{X_0[k], X_1[k], \ldots, X_s[k]\}$ $Y_1[k]$=downmixed from$\{X_0[k], X_1[k], \ldots, X_s[k]\}$ $Y_p[k]$=downmixed from$\{X_0[k], X_1[k], \ldots, X_s[k]\}$ A frequency-domain transformation is used in order to recover the time-domain samples. It is desirable that the number of shortblocks be a non-prime number with the purpose of using power-of-two based Fourier transformations. However, the general principles are applicable even for an odd or prime number of shortblocks. In these cases normal Fourier transformation may be used.

b) For converting N frequency-domain audio samples from two or more shortblock, SB, format to a longblock, LB, format, the shortblocks are no longer de-interleaved, the frequency-domain downmixing takes place and the same principle of frequency-domain to time-domain conversion using longblock is applied.

Thus, as mentioned, before the frequency-domain to time-domain conversion is applied, the frequency-domain downmixing operation from M-input channels to P-output channels is employed, which reduces the computing power required for the audio decoder function as well as the memory used for the conversion.

BRIEF DESCRIPTION OF THE SEVERAL VIEWS OF THE DRAWINGS

The invention is described in greater detail hereinbelow, by way of example only, with reference to the accompanying drawings, wherein.

DETAILED DESCRIPTION OF THE INVENTION

Figure 1:
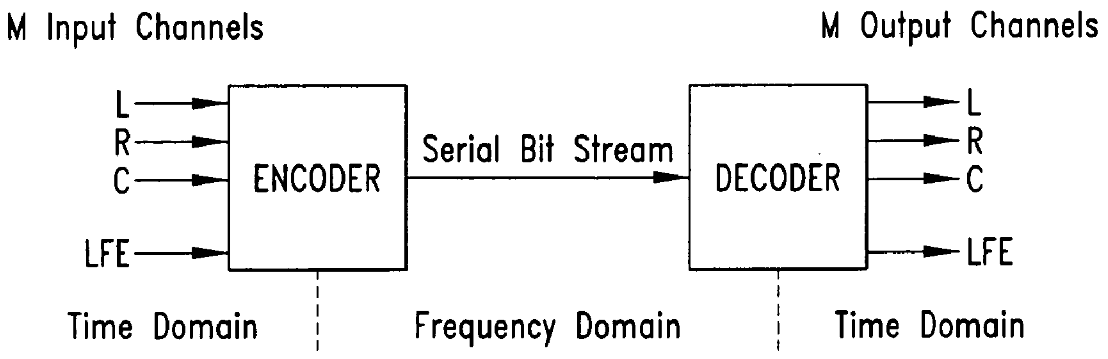
FIG. 1 is a general block diagram of an encoder and decoder system for audio compression in a multi-channel configuration.
Figure 2:
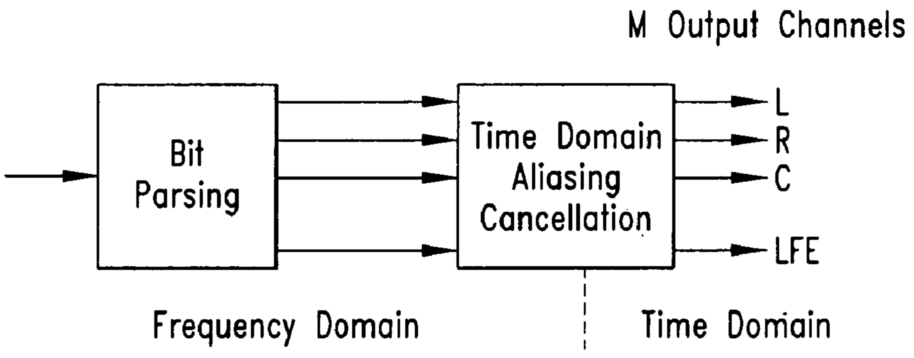
FIG. 2 is a block diagram of the decoder function of the audio system which includes bit parsing and time-domain aliasing cancellation sections.

For audio signals of a stationary or quasi-stationary nature, the PCM audio signals are partitioned in sections of 2N time-domain audio samples. The block diagram of FIG. 1 shows an example of the methodology of frequency-domain to time-domain conversion. This involves "windowing" and overlap-and-add technique to recover the PCM audio samples. This technique is described, for example, in "The Fast Fourier Transform" (E. O. Brigham, Prentice-Hall Inc., pp 206–221), the contents of which are included herein by reference. FIG. 2 shows the decoder function of the audio system which includes the bit parsing and the time-domain aliasing cancellation sections. In these configurations, the number of output channels from the decoder equals the number of input channels contained in the serial bit stream, and thus no downmixing is required.

In many reproduction systems, the number of output channels (loudspeakers) will not match the number of encoded audio channels, thus M>P. In order to reproduce the complete audio program downmixing is required. Downmixing can be performed in the time-domain. However, since the inverse transform is a linear operation, downmixing can also be performed in the frequency-domain prior to transformation. Downmixing coefficients are needed in order to keep the downmixing operation at the correct output levels without driving the output channels out of the capabilities range, and the downmixing coefficients may vary from one audio program to another, as is readily apparent to those of ordinary skill in the art. The downmixing coefficients will also allow program producers to monitor and make necessary alteration to the programs so that acceptable results are achieved for all type of listeners, from professional audio equipment enthusiasts to consumer electronics and multi-media audience.

Figure 3:
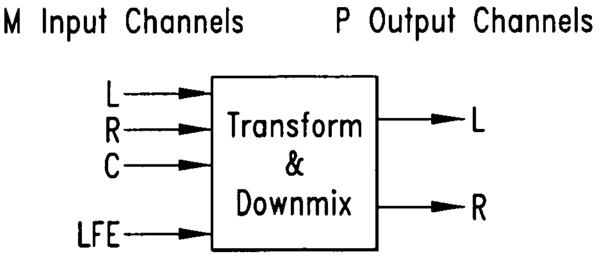
FIG. 3 is a general block diagram of a prior art audio decoder configured for downmixing.
Figure 4:
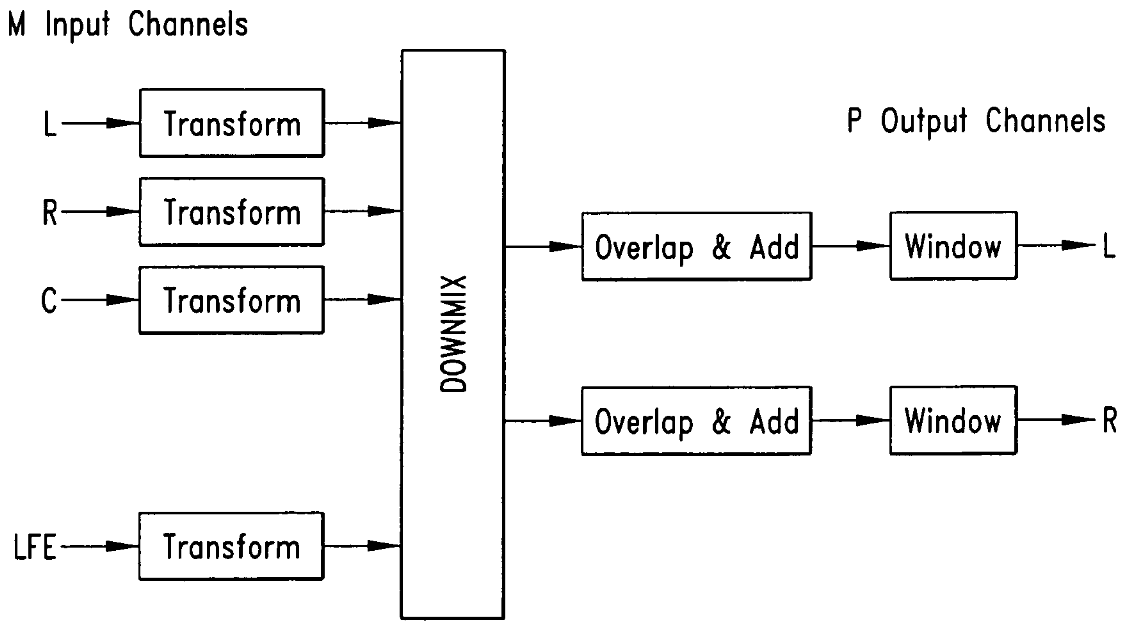
FIG. 4 is a more detailed block diagram of the audio decoder of FIG. 3, showing interconnected transformation, downmixing, overlap-and-add technique and windowing blocks.

FIG. 3 is a block diagram showing another prior art audio decoder construction, in this case requiring a downmixing function in order to provide the audio output through fewer channels than was used to encode the audio data originally. The multi-channel input section is downmixed to multi-channel output where the number of output channels is smaller than the number of input channels. The block diagram of FIG. 4 illustrates the interconnections of the transformation, downmixing, overlap-and-add technique and windowing blocks as used in prior art audio decoding and downmixing constructions. An example of this form of construction is described in U.S. Pat. No. 5,400,433, assigned to Dolby Laboratories Licensing Corporation. It is to be noted that in this form of audio decoding and downmixing, because the downmixing is performed in the time-domain format of the audio data, each of the frequency-domain channels must be inverse transformed, requiring significant computational processing power.

The overlap-and-add and windowing techniques mentioned above are described through example below. In the following example 2N=512, such that a longblock, LB, comprises 512 time-domain samples and a shortblock, SB, comprises 256 samples.

The frequency-domain coefficients are represented by:

$X[k], k=0,1, \ldots, N-1$

These frequency-domain coefficients are augmented with zeroes to form one period (e.g. 2N) of a periodic function to eliminate overlap effects. In particular, the value of N is chosen to be $N=2^{\gamma}$, $\gamma$ integer value, and $2N-N=Q$ are zero values. Note that the addition of Q zeroes ensures that there will be no end effect. The computation procedure for the inverse fast Fourier transform (IFFT) convolution, overlap-and-add method is detailed below.

Form the sampled periodic function X[k]

| | |
|---|---|
| $X[k] = X[k],$ | $k = 0, 1, \ldots, N-1$ |
| $X[k] = 0,$ | $k = N, N+1, \ldots, 2N-1$ |

Compute the inverse fast Fourier transform (IFFT) of X[k]

$$z[n] = \sum_{k=0}^{N-1} X[k]e^{j2\pi nk/N}$$

Repeat the same steps for the next period and combine the sectioned results according to:

| | |
|---|---|
| z[nJ = $z_1$[n] | n = 0, 1, . . . , 2N − Q |
| z[n + 2N − Q + 1] = $z_1$[n + 2N − Q + 1] + $z_2$[n] | n = 0, 1, . . . , 2N − Q |
| z[n + 2(2N − Q + 1)] = $z_2$[n + 2N − Q + 1] + $z_3$[n] | n = 0, 1, . . . , 2N − Q |
| etc. | |

For audio signals with random or dynamic nature, the PCM audio signals are partitioned in sections of 2N time-domain audio samples and two or more sections are taken per frame.

Figure 5:
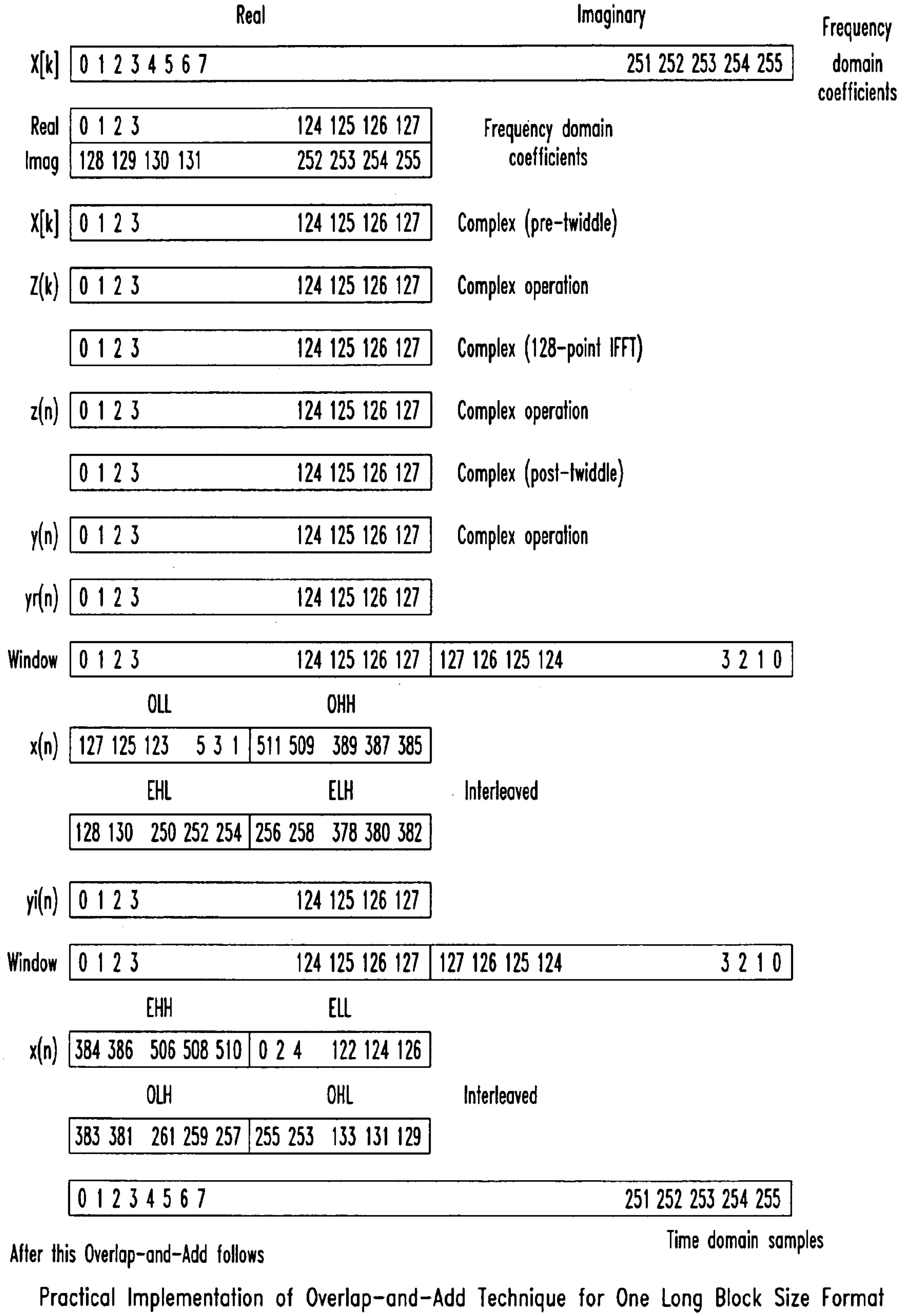
FIG. 5 shows a practical implementation of the overlap-and-add technique involving windowing.
Figure 6:
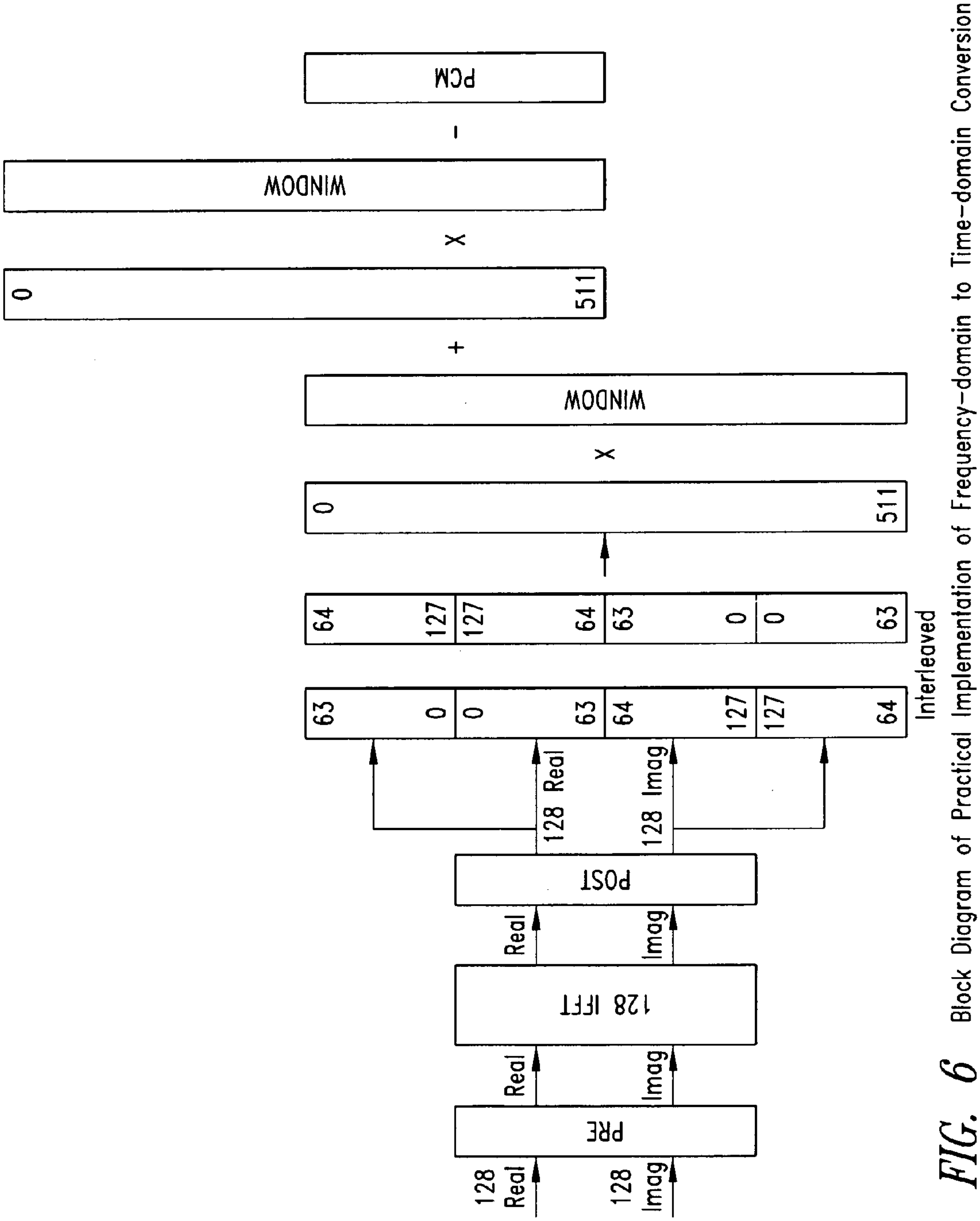
FIG. 6 shows the implementation of FIG. 5 in a block diagram form.

FIG. 5 shows a practical implementation of the overlap-and-add technique involving windowing. N frequency-domain coefficients are obtained from the encoder. N/2 of these coefficients correspond to the real part and N/2 to the imaginary part (i.e. there are N/2 complex coefficients). A pre-twiddle operation is first performed to these coefficients before converting them into the time-domain by using a N/2-point IFFT. A post-twiddle operation is performed to these time domain samples before windowing. The real part of the time-domain samples is first windowed to produce: the odd frequencies of the lowers N/4 section (OLL); the odd frequencies of the highest N/4 section (OHH); and the even frequencies of the middle N/2 section (EHL & ELH). The imaginary part of the time-domain samples is then windowed to produce: the even frequencies of the highest N/4 section (EHH); the even frequencies of the lowest N/4 section (ELL); and the odd frequencies of the middle N/2 section (OLH & OHL). FIG. 6 shows the same implementation in a block diagram form.

In the following mathematical example it is considered that the N/2=256 transformed coefficients received by the TDSP block were obtained in the encoder section by using 2N=512 real time-domain audio samples. With this consideration, some simplifications can be obtained by working in the frequency-domain.

For the practical implementation, assume that the length of the blocks is such that N=512 and 128 complex-valued transform coefficients were obtained from a 128 real-valued input sequence. Here, 128 zeroes are considered for the imaginary part.

Define the frequency-domain transform coefficients

| | |
|---|---|
| X[k] = $X_R$[k] | k = 0, 1, . . . , 127 |
| X[k] = $X_I$[k] | k = 128 . . . , 255 |

Compute N/4-point complex multiplication product

| | | |
|---|---|---|
| Z[k] = | (X[N/2 − 2k − 1]xcos1[k] − X[2k] xsin1[k]) + j(X[2k]xcos1[k]+ X[N/2 − 2k − 1]xsin1[k]), | k = 0, 1, . . . , 127 |

where xcos1[k]=−cos(2π(8k+1)/(8*N*))

xsin1[k]=−sin(2π(8k+1)/(8*N*))

Compute N/4-point complex IFFT z[n]=z[n]+Z[k](cos(8πn/N)+j(sin(8πkn/N)), n=0,1, . . . , 127

Compute N/4-point complex multiplication product

| | | |
|---|---|---|
| y[n] = | (zr[n]xcos1[n] − zi[n]xsin1[n]) + j(zi[n]xcos1[n] + zr[n]xsin1[n]), | n = 0, 1, . . . , 127 |

where zr[n]=real[z[n])

zi[n]=imag(z[n])

Compute windowed time-domain samples

| | |
|---|---|
| x[2n] = −yi[N/8 + n]w[2n]; | n = 0, 1, . . . , 63 |
| x[2n + 1] = yr[N/8 − n − 1]w[2n + 1]; | n = 0, 1, . . . , 63 |
| x[N/4 + 2n] = 1yr[n]w[N/4 + 2n]; | n = 0, 1, . . . , 63 |
| x[N/4 + 2n + 1] = yi[N/4 − n− 1]w[N/4 + 2n + 1]; | n = 0, 1, . . . , 63 |
| x[N/2 + 2n] = −yr[N/8 − n]w[N/2 − 2n − 1]; | n = 0, 1, . . . , 63 |
| x[N/2 + 2n + 1] = yi[N/8 − n− 1]w[N/2 − 2n − 2]; | n = 0, 1, . . . , 63 |
| x[3N/4 + 2n] = yi[n]w[N/4 − 2n − 1]; | n = 0, 1, . . . , 63 |
| x[3N/4 + 2n + 1] = −yr[N/4 − n − 1]w[N/4 − 2n − 2]; | n = 0, 1, . . . , 63 |

The first half of the windowed block is overlapped with the second half of the previous block. These two halves are added sample-by-sample to produce the PCM output audio samples. This implementation is represented step-by-step in FIG. 5, where the value of N=512, and the blocks shown represent data at various stages of the process. The process as described progresses down the page as shown in FIG. 5.

A similar practical implementation is obtained when two or more shortblocks are transmitted. The difference lies on the inverse transformation block size being used. The transformed block size is divided by the number of shortblocks considered. For this case, N/2=256 transformed coefficients received by the TDSP were also contained by using 2N=512 real-valued time-domain audio samples.

The difference here consists in that 256 real-valued time-domain samples are taken in first place and then converted into the frequency domain by using a 128-point FFT. This provides only 128 complex transform coefficients. The second 256 real-valued time-domain samples follow the same procedure. At the end, the two blocks of 128 complex coefficients are interleaved in order to form the 256 complex transform coefficients.

In view of the first $$\frac{N}{2}-1$$

frequency components being an exact mirror of the second $$\frac{N}{2}-1$$

components, only $$2_{\frac{N}{2}}$$

coefficients are transmitted (i.e. 128 real-valued block and 128 imaginary-valued block, one after the other).

Figure 7:
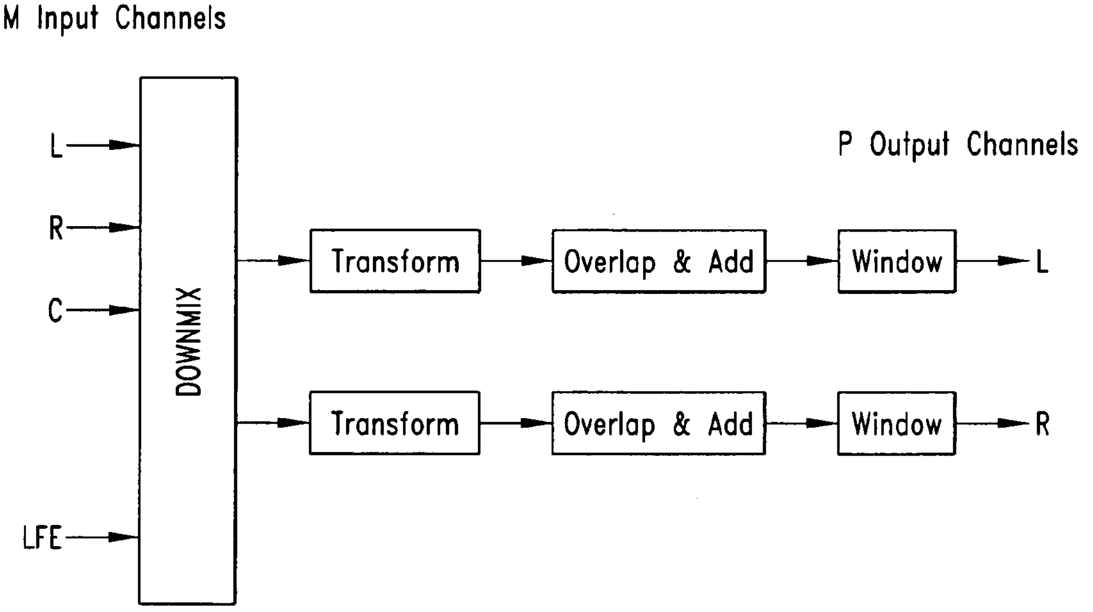
FIG. 7 is a general block diagram of an audio decoder according to an embodiment of the invention, showing interconnected block-switch selection and downmixing, transformation, overlap-and-add technique and windowing blocks.
Figure 8:
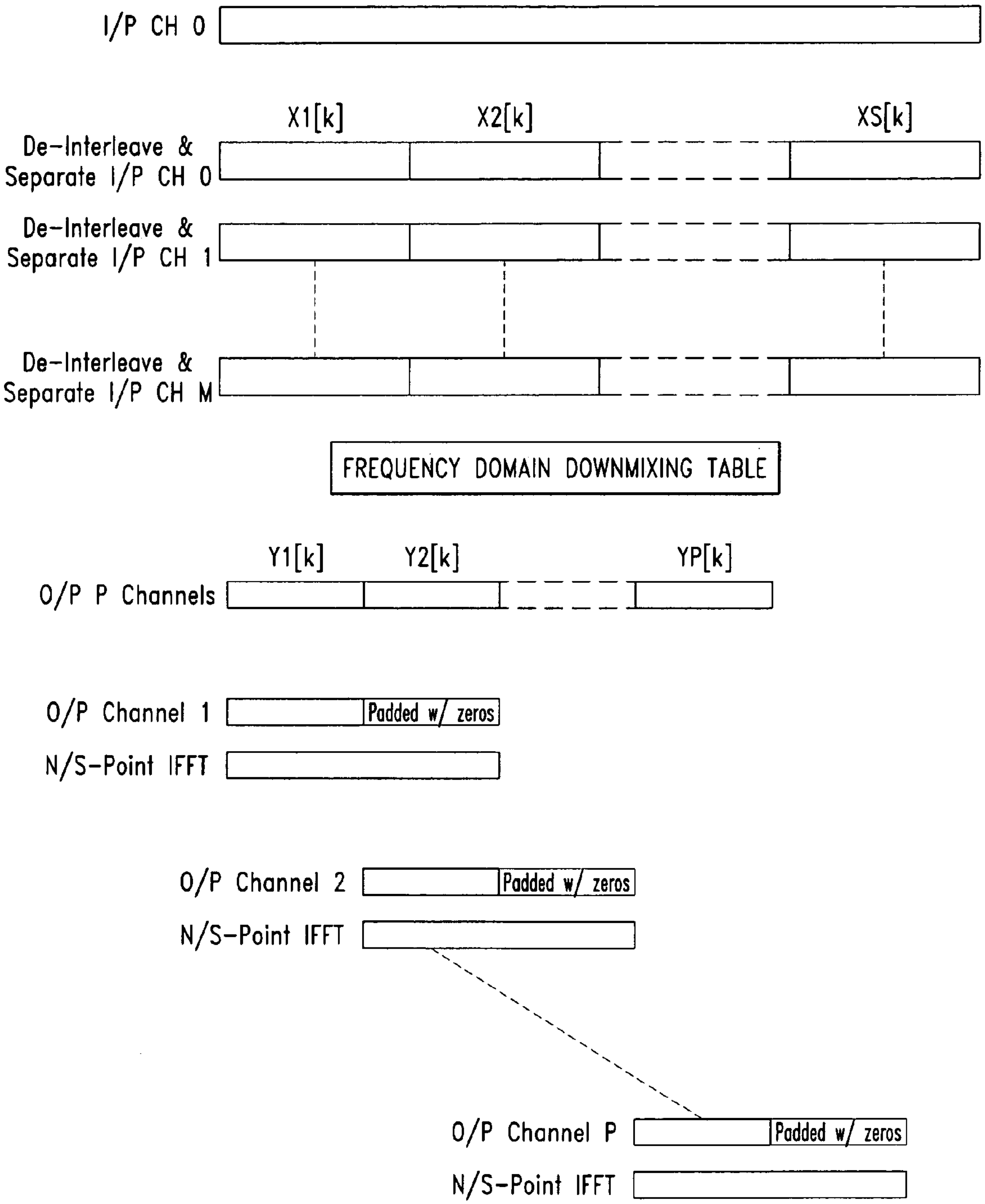
FIG. 8 shows the implementation of the frequency-domain downmixing prior to the time-domain conversion by the inverse transform, with the frequency-domain coefficients forced to be transformed by using two or more inverse transforms.

The interconnection of the block-switch selection and downmixing, transformation, overlap-and-add technique and windowing sections, according to an embodiment of the present invention, is illustrated in FIG. 7. FIG. 8 shows the implementation of the frequency-domain downmixing prior to the time-domain conversion by the inverse transform, in the case where the frequency-domain coefficients are forced to be transformed using two or more inverse transforms. The case where two or more small blocks of the frequency-domain coefficients are forced to be transformed using a single inverse transform is illustrated in FIG. 9.

Figure 9:
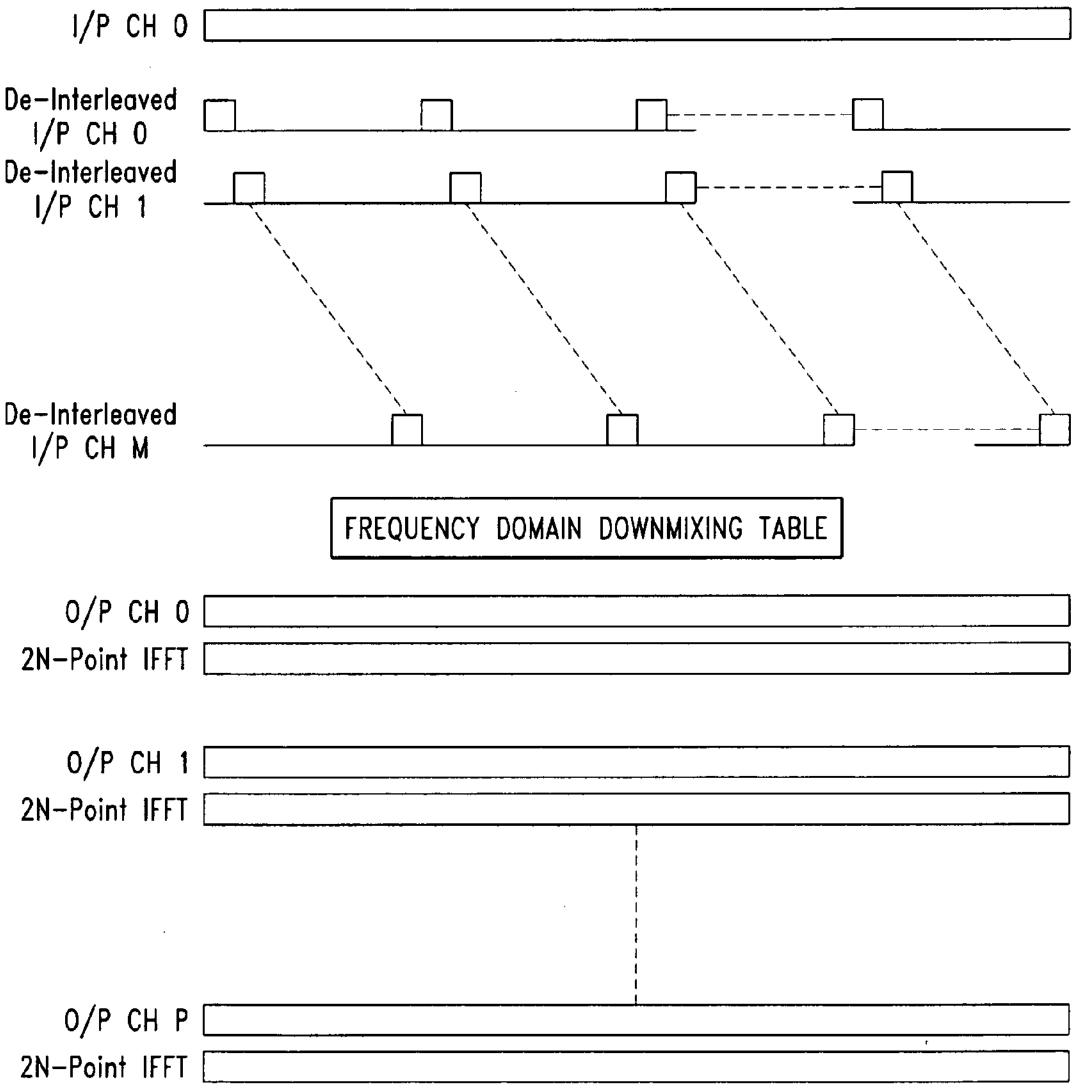
FIG. 9 shows the implementation of the frequency-domain downmixing prior to the time-domain conversion by the inverse transform, with the frequency-domain coefficients forced to be transformed using a single inverse transform.

Referring to FIGS. 8 and 9, which illustrate processing procedures of the preferred embodiment, N real-valued or complex-valued audio samples are taken and used back-to-back with N real-valued or complex-valued audio samples of the previous block to form 2N samples block (FIG. 8). Based on transients detection used to determine when to switch from a long transform block to the short transform block, each audio block is transformed into the frequency-domain by performing one long 2N-point transform, or two or more short 2N/S-point transforms. Note, S is the number of sections the long block is divided into. At the end of this step, N real-valued or complex-valued transform coefficients should be transmitted.

For real-valued audio samples, the same procedure applies but the number of transform coefficients transmitted is reduced by half. This is due to the fact that the frequency-domain coefficients are mirrored from the DC component to $$\frac{fs}{4}$$

and from $$\frac{fs}{4}$$

to $$\frac{fs}{2}.$$

In this case, only N/2 complex-valued coefficients are transmitted.

At the decoder side, two scenarios are encountered: the scenario where N/2 complex-valued coefficients of a channel which were obtained by performing one long 2N-point transform at the encoder section. There is a need to downmix these coefficients to other N/2 complex-valued coefficients of other channels which were obtained by performing two or more 2N/S-point transforms at the encoder section. The solution is to de-interleave the coefficients of the former channel and separate the number of sections, S, required. The frequency-domain downmixing is applied and the number of output channels obtained. Each of these channel's coefficients will be padded with (N/S) zeroes and the Fourier transform applied to each of them. A "window" function is used to induce the effects of block Fourier transformation and the overlap-and-add method applied to recover the original audio samples.

The second scenario is where the N/2 complex-valued coefficients of a channel were obtained by performing two or more 2N/S-point transforms at the encoder section. There is a need to downmix these coefficients to other N/2 complex-valued coefficients of other channels which were obtained by performing one long 2N-point transform at the encoder section. The solution here is to de-interleave the coefficients of the former channel and add (S−1) zeroes between the de-interleaved coefficients. The frequency-domain downmixing is applied and the number of output channels obtained. At each of these channels coefficients the Fourier transform will be applied. A "window" function is used to reduce the effects of block Fourier transformation and the overlap-and-add method applied to recover the original audio samples.

Figure 10:
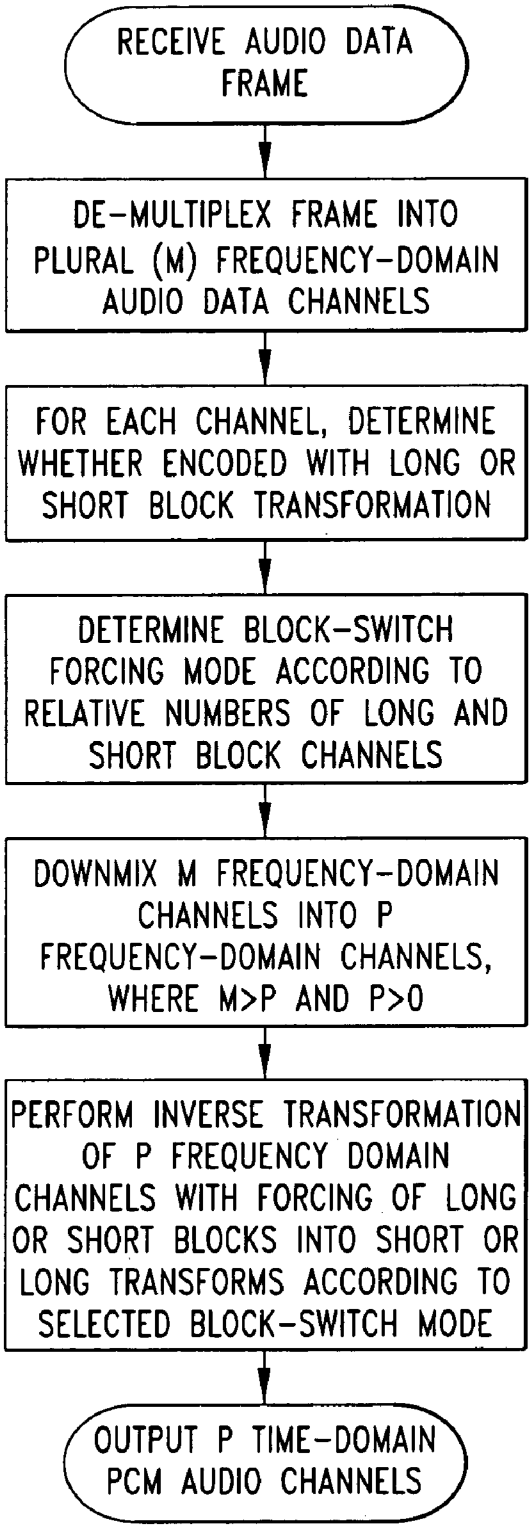
FIG. 10 is a flow diagram illustrating the general procedure for audio decoding according to embodiments of the invention.

The general procedure of audio decoding according to embodiments of the invention is illustrated in block diagram form in FIG. 10. The procedure begins with the reception by the audio decoder of a frame of encoded audio data. As mentioned this encoded audio data frame may typically originate from a either a transmission or storage system, and comprise part of a serial bit stream. The encoded audio data frame comprises a plurality of blocks of data corresponding to separate channels in the audio program, and the blocks are multiplexed together in the frame in a known way. Thus, after receiving the frame the audio decoder proceeds to de-multiplex the frame into the plural (M, M an integer >1) data blocks corresponding to audio data channels. The audio data in each data block is encoded in the frequency domain, and the method in which is was transformed from the time-domain audio samples to the frequency-domain audio data may vary depending in particular upon the time varying nature of the original audio signal frequency spectrum. For audio signals in which the frequency spectrum remains stationary or quasi-stationary, the PCM samples therefrom may typically be transformed in long blocks using a relatively long fast Fourier transform length, for example. This is advantageous in that longer transform lengths require less computing power resources than is needed for use of a shorter transform. However, if the audio frequency spectrum of the signal changes relatively rapidly with time, the performance of the audio system can be significantly enhanced if the audio signals are encoded using shorter audio data sample blocks and corresponding shorter transform lengths.

Once the audio data frame has been de-multiplexed into its constituent data channel components, each channel (data block) is examined by the decoder to determine the method by which the audio data in the block was transformed from the time-domain to the frequency domain. This might typically be accomplished by examining a sub-block-size flag or the like transmitted as part of the data block or in the frame as a whole. Of the M plural channels comprising the audio data frame, the number of channels encoded using a short transform length and the number encoded using a long transform length are tallied by the decoder.

As discussed hereinabove, a saving of computing resources can be achieved if long length transformations are employed, and that applies equally well to the inverse transformations which take place at the decoder. Thus, if it is possible to decode an audio channel using a long inverse transformation, then this is preferable from the computing resources viewpoint, even if in some instances the corresponding data block was initially encoded in several short sub-blocks using a short transform length. The use of a particular inverse transform length to decode data encoded using a different length transform is referred to herein as block-switch forcing. To minimise computing resources in the decoder it is obviously preferred that the inverse transform be force switched to longer blocks more often, however the forced use of a shorter length (and thus computationally more expensive) inverse transform where a long length transform was used for encoding is also within the ambit of the invention.

Care must be taken that the audio quality it not degraded significantly by block-switch forcing to a long inverse transform length where a short transform would ordinarily be appropriate. Accordingly, the following guidelines are utilised for the selection of the various forms of forced block-length switching, based on the relative numbers of channels in the audio data frame which were encoded using short and long length blocks.

(1) If the number of total channels is an even number (M even) and the number of channels comprising longblocks is $LB \leqq M/2$, then the channels with LB will be converted to shortblock, SB, channels.

(2) If the number of total channels is an even number (M even) and the number of channels comprising longblocks is $LB > M/2$, then the channels with LB will remain intact.

(3) If the number of total channels is an even number (M even) and the number of channels with shortblocks is $SB < M/2$, then the channels with SB will be converted to longblock, LB, channels.

(4) If the number of total channels is an even number (M even) and the number of channels with shortblocks is $SB \geqq M/2$, then the channels with SB will remain intact.

(5) If the number of total channels is an odd number (M odd) and the number of channels comprising longblocks is $LB \leqq INT(M/2)$, then the channels with LB will be converted to shortblock, SB, channels.

(6) If the number of total channels is an odd number (M odd) and the number of channels comprising longblocks is $LB > INT(M/2)$, then the channels with LB will remain intact.

(7) If the number of total channels is an odd number (M odd) and the number of channels with shortblocks is $SB < INT(M/2)$, then the channels with SB will be converted to longblock, LB, channels.

(8) If the number of total channels is an odd number (M odd) and the number of channels with shortblocks is $SB \geqq INT(M/2)$, then the channels with SB will remain intact.

The downmixing of the audio data channels from M channels to P channels (M>P) is performed using a frequency domain downmixing table, as discussed hereinabove, as is known amongst those in the relevant art. As mentioned the values of the coefficients in the downmixing table may vary from one application to another, for example depending upon the nature of the audio program to be decoded and downmixed.

Following the downmixing, the P downmixed audio channels are then inverse transformed from the frequency-domain to the time-domain so as to obtain PCM coded audio samples which can be utilised to reproduce the audio program. The form of the inverse transformation employed (e.g. short or long) is determined according to the preceding block-switch forcing mode selection. Of course following the inverse transformation the audio data samples may be subjected to overlap-and-add and windowing procedures as known in the art and discussed in some detail hereinabove. This places the decoded audio data in a condition for reproduction by an audio reproduction system, in the form of P decoded and downmixed channels as suitable for the particular reproduction system.

It will be immediately apparent to those skilled in the art that the principles of the present invention can be practically implemented in several different ways, including in software controlling general purpose computational apparatus. The preferred implementation is of course in a dedicated audio decoding integrated circuit in which the principles of the invention are embodied in hard wired circuitry or in the form of firmware provided for controlling portions of the overall audio decoder. No doubt other forms of implementation will also be apparent to those in the art, and it is intended that such forms not be excluded from the present invention where the principles described herein are nevertheless employed.

The performance measurement between this invention and previous audio decoding implementations shows that a negligible degradation is obtained. This performance degradation should nevertheless be considered when a particular hardware/software platform is implemented.

FIG. 8 shows the frequency-domain downmixing prior to transformation. The M-input channels will be analyzed to verify the number of channels with enabling or disabling block-switch capabilities. A decision is made if there is a need to convert some of the channel to block or nonblock-switch forcing. The frequency-domain coefficients of all channels are forced to have the same format and the downmix coefficients are used to obtain P output channels. These coefficients of the P channels are then inverse transformed to the time-domain and the windowing and overlap-and-add technique applied to recover the PCM output audio samples.

The foregoing detailed description of the invention has been presented by way of example only, and is not intended to be considered limiting to the invention as defined in the claims appended hereto and the equivalents thereof.

What is claimed is:

1. An audio decoder, comprising:

a demultiplexer for receiving a data signal and demultiplexing the data signal into a plurality of M frequency-domain·input data channels;

means for downmixing said M frequency-domain input channels into P frequency-domain channels, where M>P and P>0, M and P both integers;

means for selecting an inverse transformation length and forcing data blocks in the P frequency-domain channels into the selected length and performing an inverse transformation of the P frequency-domain channels according to the selected length, so as to produce P audio sample output channels.

2. The audio decoder of claim 1, wherein the means for selecting and performing an inverse transformation is biased to the selection of a long transform length.

3. The audio decoder of claim 2, further including means for determining a transformation length of each of said M frequency-domain input channels.

4. The audio decoder of claim 3, wherein the inverse transform length is selected according to the transformation lengths of the M frequency-domain input channels.

5. The audio decoder of claim 4, wherein the transformation length of the M frequency-domain input channels comprises one of either a long transform length or a short transform length.

6. The audio decoder of claim 5, wherein when the number of input channels having a long transform length is less than or equal to the integer value of M/2, then the inverse transformation of the P frequency-domain channels is performed using a short selected inverse transformation length.

7. The audio decoder of claim 5, wherein when the number of input channels having a short transform length is less than the integer value of M/2, then the inverse transformation of the P frequency-domain channels is performed using a long selected inverse transformation length.

8. A method of audio data decoding, comprising:

receiving a data signal and demultiplexing the data signal into a plurality of M frequency-domain input data channels;

downmixing said M frequency-domain input channels into P frequency-domain channels, where M> P and P>0, M and P both integers;

selecting an inverse transformation length and force block-switching of data blocks in the P frequency-domain channels to the selected length; and performing an inverse transformation of the P frequency-domain channels according to the selected length, so as to produce P audio sample output channels.

9. The method of audio data decoding of claim 8, further including determining a transformation length of each of said M frequency-domain input channels.

10. The method of audio data decoding of claim 8, wherein the selection of an inverse transformation length is biased to the selection of a long transform length.

11. The method of audio data decoding of claim 9, wherein the inverse transform length is selected according to the transformation lengths of the M frequency-domain input channels.

12. The method of audio data decoding of claim 11, wherein the transformation length of the M frequency-domain input channels comprises one of either a long transform length or a short transform length.

13. The method of audio data decoding of claim 12, wherein when the number of input channels having a long transform length is less than or equal to the integer value of M/2, then the inverse transformation of the P frequency-domain channels is performed using a short selected inverse transformation length.

14. The method of audio data decoding of claim 12, wherein when the number of input channels having a short transform length is less than the integer value of M/2, then the inverse transformation of me P frequency-domain channels is performed using a long selected inverse transformation length.

15. An audio decoder, comprising:

a downmixing circuit configured to receive M frequency-domain input channels and to downmix the M frequency-domain input channels into P frequency-domain channels, where M> P and P>0, M and P both integers;

a P number of transformation circuits, each transformation circuit coupled to a respective frequency-domain channel, each transformation circuit configured to select an inverse transformation length and performing an inverse transformation of the respective frequency-domain channel according to the selected length so as to produce time domain signals, wherein each transformation circuit is configured to select a transformation length of each of the M frequency-domain input channels from one of either a long transform length when the number of input channels having a long transform length is greater than the integer value of M/2, and otherwise selecting a short inverse transformation length;

a P number of overlap-and-add circuits coupled to respective transformation circuits and configured to apply an overlap-and-add operation to the respective time-domain signal; and a P number of windowing circuits coupled to respective overlap-and-add circuits and configured to implement a windowing function so as to produce P audio sample output signals.

16. A decoding method, comprising:

receiving a plurality of M frequency-domain input data signals and downmixing the M frequency-domain input data signals into P frequency-domain channels, where M> P and P>0, M and P both integers;

selecting an inverse transformation length for each P frequency-domain channel and performing an inverse transformation of each P frequency-domain channel according to the selected length to produce P output signals, wherein selecting the inverse transformation length comprises selecting a short inverse transformation length when the number of frequency-domain input signals having a long transformation length is less than or equal to the integer value of M/2, and otherwise selecting a long inverse transformation length;

performing an overlap-and-add function on the P output signals; and subsequently performing a windowing function to produce audio output signals.

17. An audio decoder, comprising:

a demultiplexer for receiving a data signal and demultiplexing the data signal into a plurality of M frequency-domain·input data channels each having a respective block length;

a downmixing circuit adapted to downmix the M frequency-domain input channels into P frequency-domain channels, where M>P and P>0, M and P are both integers;

a circuit for selecting an inverse transformation length, forcing the P frequency-domain channels to the selected inverse transformation length, and performing an inverse transformation of the P frequency-domain channels according to the selected length to produce P audio sample output channels.

18. An audio decoder, comprising:

a demultiplexer for receiving a data signal and demultiplexing the data signal into a plurality of M frequency-domain input data channels;

a circuit for downmixing the M frequency-domain input channels into P frequency-domain channels, where M> P and P>0, M and P are both integers, the circuit configured to de-interleave and zero pad selected frequency-domain channels in accordance with a selected inverse transformation length and to force the P frequency-domain channels to the same inverse transformation length; and an inverse transformation circuit for performing an inverse transformation of the P frequency-domain channels according to the selected length so as to produced P audio sample output channels.

19. An audio decoding method, comprising:

receiving a data signal an demultiplexing the data signal into a plurality of M frequency-domain input data channels;

downmixing the M frequency-domain input data channels into P frequency-domain channels, where M>P and P>0, M and P are both integers; and selecting an inverse transformation length, forcing the P frequency-domain channels to the selected inverse transformation length and performing an inverse transformation of the P frequency-domain channels according to the selected length so as to produce P audio sample output channels.

20. A method of audio data decoding, comprising:

receiving a data signal and demultiplexing the data signal into a plurality of M frequency-domain input data channels;

downmixing the M frequency-domain input channels into P frequency-domain channels, where M>P and P>0, M and P are both integers, and de-interleaving and zero padding the channels so that all P frequency-domain channels have a selected inverse transformation length; and performing an inverse transformation of the P frequency-domain channels according to the selected length so as to produce P audio sample output channels.

* * * * *